United States Patent
Shibata et al.

(10) Patent No.: US 10,459,068 B2
(45) Date of Patent: Oct. 29, 2019

(54) LOCATION SYSTEM AND COMPUTER PROGRAM

(71) Applicant: Murata Manufacturing Co., Ltd., Kyoto (JP)

(72) Inventors: Osamu Shibata, Kyoto (JP); Koichi Ichige, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/872,105

(22) Filed: Jan. 16, 2018

(65) Prior Publication Data

US 2018/0136310 A1    May 17, 2018

Related U.S. Application Data

(63) Continuation of application No. PCT/JP2016/069151, filed on Jun. 28, 2016.

(30) Foreign Application Priority Data

Jul. 17, 2015 (JP) ................................. 2015-142961

(51) Int. Cl.
*G01S 5/06* (2006.01)
*G01S 5/02* (2010.01)

(52) U.S. Cl.
CPC .................................... *G01S 5/06* (2013.01)

(58) Field of Classification Search
CPC ................................ G01S 5/06; G01S 5/0221
See application file for complete search history.

(56) References Cited

U.S. PATENT DOCUMENTS

| 4,799,062 A | * | 1/1989 | Sanderford, Jr. | ..... G01S 5/0009 340/8.1 |
| 5,471,501 A | * | 11/1995 | Parr | ..... H04L 25/025 375/232 |

(Continued)

FOREIGN PATENT DOCUMENTS

| JP | 2005-326184 A |   | 11/2005 |
| JP | 2005326184 A | * | 11/2005 |

(Continued)

OTHER PUBLICATIONS

International Search Report for International Application No. PCT/JP2016/069151, dated Sep. 6, 2016.

(Continued)

*Primary Examiner* — Mehmood B. Khan
(74) *Attorney, Agent, or Firm* — Pearne & Gordon LLP (57) ABSTRACT

A time of arrival t and a carrier wave phase $\phi$ of a positioning pulse that is transmitted from a mobile station in each posteriori period and that is received by each of at least three fixed stations are input. Then, by using an error reduction algorithm, a time of arrival $t_{k+1}$ of the positioning pulse in the following posteriori period is predicted by using a carrier wave phase difference $\Delta\phi$ of the positioning pulse. Then, by using the predicted time of arrival t of the positioning pulse, the location of the mobile station is calculated. A time interval dt of a posteriori period is set to a time interval with which a difference $\Delta\phi_{nm}$ between the carrier wave phase differences, which is changed by the movement of the mobile station at an assumable maximum movement speed, is no greater than 180°.

13 Claims, 1 Drawing Sheet

(56) References Cited

U.S. PATENT DOCUMENTS

| | | | | |
|---|---|---|---|---|
| 5,596,330 A * | 1/1997 | Yokev | G01S 1/026 | 342/387 |
| 5,943,331 A * | 8/1999 | Lavean | H04B 1/707 | 370/208 |
| 7,764,231 B1 * | 7/2010 | Karr | G01S 1/026 | 342/457 |
| 8,604,964 B2 * | 12/2013 | Eidloth | G01S 11/02 | 342/114 |
| 8,817,578 B2 * | 8/2014 | Izumi | G01S 3/48 | 367/125 |
| 9,622,041 B2 * | 4/2017 | Garcia | H04W 24/08 | |
| 2002/0094824 A1 * | 7/2002 | Kennedy, Jr. | G01S 5/02 | 455/456.5 |
| 2005/0113042 A1 * | 5/2005 | Felter | H01Q 3/30 | 455/121 |
| 2005/0113141 A1 * | 5/2005 | Felter | H04B 1/709 | 455/562.1 |
| 2008/0188236 A1 * | 8/2008 | Alles | G01S 5/021 | 455/456.1 |
| 2009/0146831 A1 * | 6/2009 | Mergen | G01S 11/02 | 340/8.1 |
| 2010/0220013 A1 * | 9/2010 | Suzuki | G01S 5/06 | 342/442 |
| 2010/0302102 A1 * | 12/2010 | Desai | G01S 3/50 | 342/417 |
| 2011/0181469 A1 * | 7/2011 | Eidloth | A63B 24/0021 | 342/387 |
| 2012/0056786 A1 * | 3/2012 | Pandey | G01S 5/021 | 342/463 |
| 2013/0106657 A1 * | 5/2013 | Perthold | G01S 5/021 | 342/387 |
| 2013/0225200 A1 * | 8/2013 | Ben Hamida | G01S 5/0289 | 455/456.1 |
| 2013/0285855 A1 * | 10/2013 | Dupray | G01S 19/48 | 342/451 |
| 2015/0180561 A1 * | 6/2015 | Jindal | H04L 25/03898 | 375/267 |
| 2015/0256972 A1 * | 9/2015 | Markhovsky | H04W 4/90 | 455/456.1 |
| 2016/0349353 A1 * | 12/2016 | Wang | G01S 5/14 | |
| 2017/0227363 A1 * | 8/2017 | Yuan | G01C 21/206 | |
| 2018/0164400 A1 * | 6/2018 | Wirola | G01S 5/0252 | |
| 2019/0037351 A1 * | 1/2019 | Prevatt | H04L 5/005 | |

FOREIGN PATENT DOCUMENTS

| | | | |
|---|---|---|---|
| JP | 2006-10573 A | | 1/2006 |
| JP | 2006010573 A | * | 1/2006 |
| JP | 2008-228163 A | | 9/2008 |
| JP | 2012-506032 A | | 3/2012 |

OTHER PUBLICATIONS

Written Opinion for International Application No. PCT/JP2016/069151, dated Sep. 6, 2016.

IEEE Computer Society, "Part 15.4: Low-Rise Wireless Personal Area Networks (LR-WPANs)", IEEE Standards Association, Sep. 5, 2011, pp. i to 294, Std 802.15A-2011, IEEE, New York, United States of America.

* cited by examiner

LOCATION SYSTEM AND COMPUTER PROGRAM

This is a continuation of International Application No. PCT/JP2016/069151 filed on Jun. 28, 2016 which claims priority from Japanese Patent Application No. JP 2015-142961 filed on Jul. 17, 2015. The contents of these applications are incorporated herein by reference in their entireties.

BACKGROUND

Technical Field

The present disclosure relates to a location system and a computer program by which a mobile station is located on the basis of the time of arrival of a radio signal that arrives from the mobile station to a fixed station.

As a location system of this type, there has been a real time location system (RTLS) that locates a mobile station in real time. A typical technique for the RTLS is a time difference of arrival (TDOA) technique using TDOA information. With the TDOA technique, a plurality of fixed stations at known locations and a location calculation server calculate the location of the mobile station. Typically, the fixed stations are temporally synchronized, and each of the fixed stations receives a radio signal transmitted from the mobile station. As the radio signal, a pulse signal or a signal having a similar waveform is used.

The location of the mobile station is calculated from the difference in the time of reception of the fixed stations. An RTLS using such a TDOA technique is, for example, a location notification system disclosed in Patent Document 1.

In addition, a phase-based tracking technique is also used for a locating technique. With the phase-based tracking technique, a movement amount of an object between measurement times, that is, a relative change amount in the location of an object, is calculated from a change in the carrier phase of a radio signal received at each measurement. Such a locating technique is used for, for example, a system that determines the movement of a swaying structure disclosed in Patent Document 2. In this system, at least three reference transmitters whose locations are known and fixed are provided, and a receiver is attached to the swaying structure. These reference transmitters transmit a transmission signal at a prescribed carrier frequency, and the receiver receives the transmission signal. An evaluation apparatus compares the phase of each carrier received by the receiver with the phase of each of the reference transmitters, and determines the phase difference. Then, from the phase difference, a change in the location of the swaying structure is calculated.

Patent Document 1: Japanese Unexamined Patent Application Publication No. 2008-228163

Patent Document 2: Japanese Unexamined Patent Application Publication (Translation of PCT application) No. 2012-506032

BRIEF SUMMARY

In a typical TDOA technique for an RTLS, it is desirable that the pulse width of a pulse signal be as small as possible in order to increase the resolution for measuring the time of reception of the pulse signal. The decrease in the pulse width, however, increases a signal occupied band width, which causes an issue in terms of the Radio Law or the like to be put into practical use. In a TDOA technique in a high-speed sensor network in which ultra wide band (UWB), which is studied to be standardized by IEEE Std 802.15.4-2011, is used in the infrastructure (physical layer), the band width is normally about 1 GHz, and the distance resolution is about 30 cm. However, depending on the country, the transmission, outdoor use, and the like of UWB may be restricted by the regulations, in which case UWB is inapplicable. On the other hand, in a case of using, instead of UWB, for example, the 2.4 GHz industry science medical (ISM) band, the band width is about 80 MHz, which generates an error of about a few meters in the distance resolution.

In addition, in a phase-based tracking technique, although depending on the use frequency, a higher resolution can be obtained typically from the carrier phase than from the time of a pulse signal. For example, in a case of the 2.4 GHz ISM band, the wavelength is about 12 cm, and an accuracy of 1 cm or less in the distance resolution can be obtained even if a measurement error of about 20° is taken into account. On the other hand, the phase becomes the same state every 360°. For example, the above ISM band becomes the same state every about 12 cm. Thus, it is not possible to acquire the absolute location among possible locations.

In the locating technique in the above Patent Document 2, a change amount in the movement of an object is obtained from the phase alone. Accordingly, the location of the object can be calculated from the change amount in the movement of the object if the initial location is known. However, if the object is suddenly moved, for example, the object might be located at somewhere else at which phase differs by an integer multiple of 360°. Patent Document 2 points out this as "the 2π ambiguity of the measured phase values". In order to prevent this, the measurement interval needs to be dense so that the movement amount of the object between measurements can be less than or equal to a phase π, that is, less than or equal to the half wavelength. This is based on the logic that the object does not move more than the half wavelength during an extremely short time interval for measurement. In a case of a phase shift of 2π even if such measures are taken, a special operation for that is needed.

Accordingly, in the phase-based locating method, the system needs to be designed such that measurement is performed with an extremely short time interval to be used for an application in which the target mobile station moves fast. This, however, increases the measurement frequency, which increases power consumption, the occurrence frequency of signal collision when tracking a plurality of targets, and the like. In addition, the initial location needs to be acquired by some means or other. Furthermore, also when the mobile station moves more than the half wavelength, the state thereof needs to be acquired by some means or other and to be corrected.

The present disclosure has been made in order to solve the above problem. A location system includes: at least three fixed stations whose install locations are known; at least one mobile station that transmits a radio signal to each of the fixed stations in each posteriori period of location calculation; and a calculation apparatus that calculates, by using a computer, a location of the mobile station on the basis of a time of arrival of the radio signal that arrives from the mobile station to each of the fixed stations. Each of the fixed stations detects the time of arrival of the radio signal that arrives in each posteriori period and a carrier wave phase of the radio signal. The calculation apparatus includes a prediction unit and a location calculation unit. The prediction unit predicts, from the time of arrival of the radio signal in a preceding posteriori period, the time of arrival of the radio signal in a following posteriori period by using a carrier wave phase difference of the radio signal. The prediction is enabled by using an error reduction algorithm for predicting a more reliable system state value by correcting an error included in a system state value on the basis of a state measurement value. The location calculation unit calculates the location of the mobile station by using the time of arrival of the radio signal predicted by the prediction unit.

In addition, the present disclosure provides a computer program for causing a computer to execute: an input step; a prediction step, and a calculation step.

In the input step, a time of arrival and a carrier wave phase of a radio signal are input, the radio signal being transmitted from at least one mobile station in each posteriori period of location calculation and being received by each of at least three fixed stations whose install positions are known. In the prediction step, from the time of arrival of the radio signal in a preceding posteriori period, the time of arrival of the radio signal in a following posteriori period is predicted by using a carrier wave phase difference of the radio signal, the predicting being enabled by using an error reduction algorithm for predicting a more reliable system state value by correcting an error included in a system state value on the basis of a state measurement value. In the calculation step, a location of the mobile station is calculated by using the predicted time of arrival of the radio signal.

According to the above configurations, in the calculation apparatus in the location system, the prediction unit predicts, from the time of arrival of the radio signal in the preceding posteriori period, the time of arrival of the radio signal in the following posteriori period by using the carrier wave phase difference of the radio signal. In addition, the location calculation unit calculates the location of the mobile station by using the time of arrival of the radio signal predicted by the prediction unit. In addition, the computer program causes a computer, in the input step, to input the time of arrival and the carrier wave phase of the radio signal received by each of the fixed stations, and in the prediction step, to predict, from the time of arrival of the radio signal in the preceding posteriori period, the time of arrival of the radio signal in the following posteriori period by using the carrier wave phase difference of the radio signal. In addition, in the calculation step, the computer program causes a computer to calculate, by using the predicted time of arrival of the radio signal, the location of the mobile station.

Thus, the time of arrival of a positioning pulse used for the location calculation of the mobile station is predicted by using the carrier wave phase difference with higher accuracy by a few orders of magnitude than the time accuracy. Accordingly, the location of the mobile station is calculated with high accuracy even in a case in which UWB with a large signal occupied band width and a high distance resolution is not used. In addition, since the absolute location of the mobile station is calculated on the basis of the absolute value of the time of arrival predicted with high accuracy by using the error reduction algorithm, the initial location of the mobile station does not have to be acquired in advance. Even in a case in which an error is generated by any chance as a result of a phase shift by an integer multiple of 360°, the prediction process is continuously updated one by one by using the error reduction algorithm, and thereby the phase shift is corrected. Thus, in a case in which the mobile station moves more than the half wavelength, a process for acquiring the state thereof by some means or other and correcting the state is unnecessary unlike in the known technique.

In the location system according to the present disclosure, the prediction unit includes a time difference calculation unit, a phase difference calculation unit, and an error reduction unit. The time difference calculation unit calculates a time difference of arrival of the radio signal between the fixed stations. The phase difference calculation unit calculates a difference between a carrier wave phase difference of the radio signal between the fixed stations and a carrier wave phase difference of the radio signal between the fixed stations in a posteriori period that is one period earlier. The error reduction unit performs calculation by using the error reduction algorithm to increase reliability of the time of arrival of the radio signal in the following posteriori period, the time of arrival being predicted from the time difference of arrival and the difference between the carrier wave phase differences.

In the computer program according to the present disclosure, in the prediction step, a time difference of arrival of the radio signal between the fixed stations is calculated, a difference between a carrier wave phase difference of the radio signal between the fixed stations and a carrier wave phase difference of the radio signal between the fixed stations in a posteriori period that is one period earlier is calculated, and calculation is performed by using the error reduction algorithm to increase reliability of the time of arrival of the radio signal in the following posteriori period, the time of arrival being predicted from the time difference of arrival and the difference between the carrier wave phase differences.

According to the above configuration, the time difference of arrival of the radio signal between the fixed stations is calculated, the difference between the carrier wave phase difference of the radio signal between the fixed stations and the corresponding phase difference in the a posteriori period that is one period earlier is calculated, and by using the error reduction algorithm, the reliability of the time of arrival of the radio signal in the following posteriori period, the time of arrival being predicted from the time difference of arrival and the difference between the carrier wave phase differences is increased.

In the location system and the computer program according to the present disclosure, the time interval of the posteriori period is set to a time interval with which the difference between the carrier wave phase differences, which is changed during the time interval of the posteriori period by movement of the mobile station, is no greater than 180°.

According to the above configuration, the failure of identifying the location of the mobile station can be prevented, the failure being caused by the ambiguity of the phase as a result of the difference becoming 180° or greater owing to the movement of the mobile station during the time interval of the posteriori period. Accordingly, the time difference of arrival of the radio signal is predicted with extremely high accuracy by using the error reduction algorithm, and the mobile station can be located with extremely high accuracy.

In the location system according to the present disclosure, the mobile station transmits the radio signal a plurality of times, with a predetermined time interval, in each posteriori period. Each of the fixed stations detects the time of arrival of at least one radio signal among the plurality of times and carrier wave phases of two or more radio signals among the plurality of times. The prediction unit includes a time difference calculation unit, a phase difference calculation unit, and an error reduction unit. The time difference calculation unit calculates a time difference of arrival of the radio signal between the fixed stations from the time of arrival of at least one radio signal. The phase difference calculation unit calculates a difference between a carrier wave phase difference of the radio signal between the fixed stations, calculated from a carrier wave phase of a radio signal among two or more radio signals, and a carrier wave phase difference of the radio signal between the fixed stations, calculated from a carrier wave phase of an other-time radio signal. The error reduction unit performs calculation by using the error reduction algorithm to increase reliability of the time of arrival of the radio signal in the following posteriori period, the time of arrival being predicted from the time difference of arrival and the difference between the carrier wave phase differences.

In the computer program according to the present disclosure, in the input step, the time of arrival of at least one radio signal among a plurality of times and carrier wave phases of two or more radio signals among the plurality of times, which are detected by each of the fixed stations from the radio signal that is transmitted the plurality of times from the mobile station in each posteriori period with a predetermined time interval, are input. In the prediction step, a time difference of arrival of the radio signal between the fixed stations is calculated from the time of arrival of at least one radio signal, and a difference between a carrier wave phase difference of the radio signal between the fixed stations, calculated from a carrier wave phase of a radio signal among two or more radio signals, and a carrier wave phase difference of the radio signal between the fixed stations, calculated from a carrier wave phase of an other-time radio signal, is calculated, and calculation is performed by using the error reduction algorithm to increase reliability of the time of arrival of the radio signal in the following posteriori period, the time of arrival being predicted from the time difference of arrival and the difference between the carrier wave phase differences.

According to the above configuration, the time difference of arrival of the radio signal between the fixed stations is calculated from the time of arrival of at least one radio signal among a plurality of radio signals transmitted from the mobile station in each posteriori period with the predetermined time interval. In addition, the difference between the carrier wave phase difference of the radio signal between the fixed stations, calculated from the carrier wave phase of the radio signal among two or more radio signals, and the corresponding carrier wave phase difference, calculated from the carrier wave phase of the other-time radio signal, is calculated. By using the error reduction algorithm, the time of arrival of the radio signal in the following posteriori period is predicted with higher reliability from the calculated time difference of arrival and the difference between the carrier wave phase differences.

Thus, the time interval of the radio signal that is transmitted a plurality of times from the mobile station in each posteriori period is adjusted to be shorter than the time interval for preventing the ambiguity of the phase as a result of the movement of the mobile station, and accordingly, the time interval of each posteriori period can be made longer than the time interval for preventing the ambiguity of the phase as a result of the movement of the mobile station. Thus, according to this configuration, in addition to the above-described effects of detecting the location of the mobile station with high accuracy without necessarily acquiring the initial location of the mobile station in advance, effects of reducing the transmission frequency of the radio signal from the mobile station and of reducing power consumption of the system are produced. In addition, since the transmission frequency of the radio signal can be reduced, an effect of reducing the occurrence frequency of collision can be produced even in a case in which a plurality of mobile stations transmits a signal. In addition, in the above configuration, it is possible to calculate at least two or more time differences of arrival for the fixed stations from times of arrival of at least two or more radio signals among a plurality of transmitted radio signals and to use the average of the time differences of arrival. According to this configuration, it is possible to reduce errors of the time differences of arrival.

In the location system and the computer program according to the present disclosure, the predetermined time interval of the radio signal transmitted a plurality of times in each posteriori period is set to a time interval with which the difference between the carrier wave phase differences, which is changed during the predetermined time interval by movement of the mobile station, is no greater than 180°.

According to this configuration, the failure of identifying the location of the mobile station can be prevented, the failure being caused by the ambiguity of the phase as a result of the difference between the carrier wave phase differences becoming 180° or greater owing to the movement of the mobile station during the time interval of the radio signal that is transmitted a plurality of times. Accordingly, the time of arrival of the radio signal is predicted with extremely high accuracy by using the error reduction algorithm, and the mobile station can be located with extremely high accuracy.

In the location system and the computer program according to the present disclosure, a number of times of transmission of the radio signal transmitted a plurality of times from the mobile station with the predetermined time interval is two.

According to this configuration, the number of times of transmission of the radio signal is limited to two, which is the minimum of a plurality of times. Thus, the power consumption of the system and the occurrence frequency of collision can be reduced to the maximum.

In the location system and the computer program according to the present disclosure, the error reduction algorithm is a Kalman filter algorithm with which a system state measurement value is acquired every time a time step proceeds, the acquired state measurement value is compared with a system state predicted value that is predicted one time step earlier, and the state predicted value of a following time step is corrected to predict a more reliable system state value.

According to the above configurations, it is possible to predict the time of arrival of the radio signal easily and accurately by using a known, relatively easy algorithm.

According to the present disclosure, it becomes possible to provide a location system and a computer program by which the location of a mobile station can be calculated with high accuracy even in a case of not using UWB with a large signal occupied band width and a high distance resolution, and by which the power consumption of the system and the occurrence frequency of collision can be reduced.

DETAILED DESCRIPTION

Next, embodiments for implementing a location system and a computer program according to the present disclosure will be described.

Figure 1:
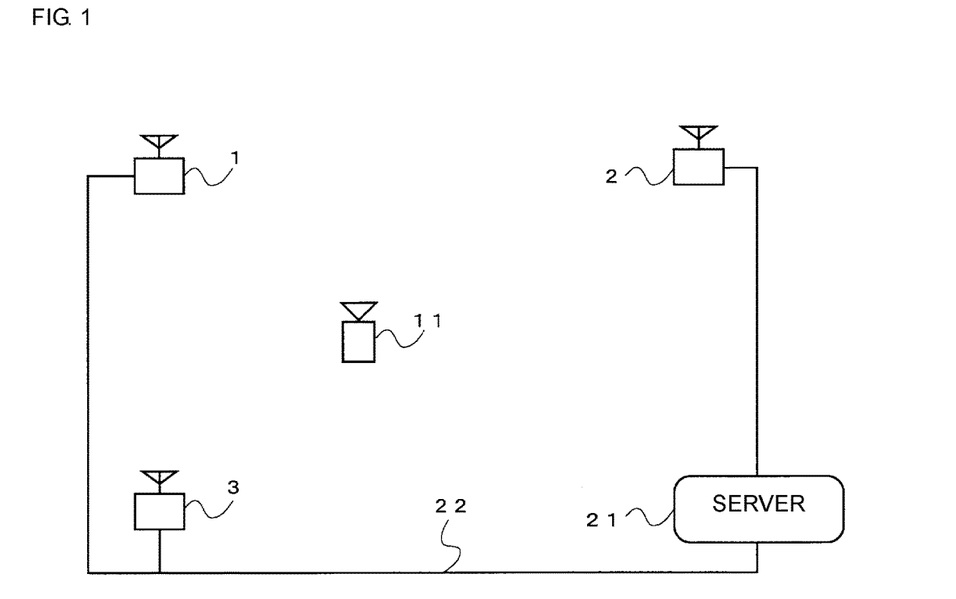
FIG. 1 is a block diagram illustrating a fundamental configuration of a location system according to an embodiment of the present disclosure.

FIG. 1 is a block diagram illustrating a fundamental configuration of a location system according to a first embodiment of the present disclosure.

A hardware configuration of the location system according to this embodiment is substantially the same as the configuration of a typical TDOA-based RTLS and includes at least three fixed stations (anchors) 1, 2, and 3, a mobile station (target) 11, and a location calculation server 21. The mobile station 11 repeatedly transmits a positioning pulse P as a radio signal to each of the fixed stations 1, 2, and 3 in each posteriori period of location calculation. The location calculation server 21 is a calculation apparatus that calculates the location of the mobile station 11 by using a computer on the basis of the time of arrival of a radio signal that arrives from the mobile station 11 to each of the fixed stations 1, 2, and 3 and includes a central processing unit (CPU), a read only memory (ROM), a random access memory (RAM), and the like. The CPU controls various calculations by using the RAM as a temporary memory work area in accordance with a computer program stored in the ROM. The location system according to this embodiment differs from a typical TDOA-based RTLS in the computer program stored in the ROM.

Each of the fixed stations 1, 2, and 3 is connected to the location calculation server 21 via a wire 22 or wirelessly, and the times and phases of the fixed stations 1, 2, and 3 are synchronized. One of the fixed stations 1, 2, and 3 may also serve as the location calculation server 21. Each of the fixed stations 1, 2, and 3 is appropriately disposed so as to be able to receive a radio signal from the mobile station 11 in an area in which the location of the mobile station 11 is wished to be acquired (location acquisition area), and install locations of the fixed stations 1, 2, and 3 are known. The location acquisition area includes at least one mobile station 11 whose location is to be acquired, and the location calculation server 21 locates the mobile station 11 while tracking the mobile station 11 in a state of moving within the location acquisition area.

Figure 2:
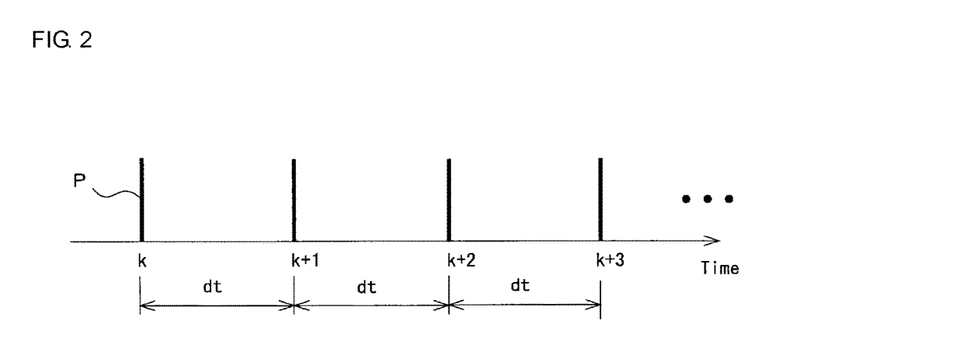
FIG. 2 is a timing chart illustrating transmission timings of a positioning pulse to be transmitted from a mobile station to each of fixed stations in a location system according to a first embodiment.

FIG. 2 is a timing chart illustrating transmission timings of the positioning pulse P transmitted from the mobile station 11 to each of the fixed stations 1, 2, and 3 in the location system according to the first embodiment. As illustrated in the figure, the positioning pulse P is discretely transmitted at times k, k+1, k+2, k+3, . . . in posteriori periods of location calculation with a time interval dt. In the first embodiment, a transmission period of the positioning pulse P is the same as the posteriori period of location calculation. At every transmission timing, each of the fixed stations 1, 2, and 3 measures a time of arrival t and a carrier wave phase $\phi$ of the positioning pulse P and detects the time of arrival t and the carrier wave phase $\phi$ of the positioning pulse P that arrives in each posteriori period.

The location calculation server 21 includes a prediction unit and a location calculation unit. The prediction unit predicts, from the time of arrival t of the positioning pulse P in a posteriori period at the preceding time k−1, the time of arrival t of the positioning pulse P in a posteriori period at the following time k by using a carrier wave phase difference $\Delta\phi$ of the positioning pulse P. The prediction is enabled by using an error reduction algorithm for predicting a more reliable system state value by correcting an error included in a system state value on the basis of a state measurement value. The location calculation unit calculates the location of the mobile station 11 by using the time of arrival t of the positioning pulse P predicted by the prediction unit.

In this embodiment, the prediction unit includes a time difference calculation unit, a phase difference calculation unit, and an error reduction unit. The units included in the prediction unit and the above-described location calculation unit are realized by hardware resources such as a CPU, a ROM, and a RAM and function by a program stored in the ROM, which will be described later, being executed.

In a case in which n and m are different values of 1, 2, or 3, the time difference calculation unit calculates a time difference of arrival $t_{nm}$ of the positioning pulse P between fixed stations n and m from of times of arrival $t_n$ and $t_m$ of positioning pulse P measured by the fixed stations n and m at time k, according to the following formula (1).

$$t_{nm} = t_m - t_n \tag{1}$$

From carrier wave phases $\phi_n^{(k)}$ and $\phi_m^{(k)}$ measured by the fixed stations n and m at time k and carrier wave phases $\phi_n^{(k-1)}$ and $\phi_m^{(k-1)}$ measured by the fixed stations n and m at time k−1, the phase difference calculation unit calculates a difference $\Delta\phi_{nm}$ according to the following formula (2). The difference $\Delta\phi_{nm}$ is a difference between a carrier wave phase difference $\phi_{mn}^{(k)}(=\phi_m^{(k)}-\phi_n^{(k)})$ of the positioning pulse P between the fixed stations n and m in the posteriori period at time k and a carrier wave phase difference $\phi_{nm}^{(k-1)}$ $(=\phi_m^{(k-1)}-\phi_n^{(k-1)})$ of the positioning pulse P between the fixed stations n and m in the posteriori period at time k−1, which is one period earlier.

$$\Delta\phi_{nm} = \phi_{nm}^{(k)} - \phi_{nm}^{(k-1)} = (\phi_m^{(k)} - \phi_n^{(k)}) - (\phi_m^{(k-1)} - \phi_n^{(k-1)}) \tag{2}$$

By using the above-described error reduction algorithm, the error reduction unit performs calculation to increase the reliability of a time difference of arrival $t_{nm}'$ of the positioning pulse P in the following posteriori period at time k+1. The time difference of arrival $t_{nm}'$ is predicted from the time difference of arrival $t_{nm}$ and the difference $\Delta\phi_{nm}$ between the carrier wave phase differences.

The ROM has a computer program stored therein, the computer program causing a computer to execute an input step, a prediction step, and a calculation step. In the input step, the time of arrival t and the carrier wave phase $\phi$ of the positioning pulse P is input. The positioning pulse P is repeatedly transmitted from the mobile station 11 in each posteriori period and is received by each of the at least three fixed stations 1, 2, and 3 whose install positions are known. In the prediction step, by using the above-described error reduction algorithm, from a time of arrival $t_k$ of the positioning pulse P in the preceding posteriori period, a time of arrival $t_{k+1}$ of the positioning pulse P in the following posteriori period is predicted by using the carrier wave phase difference $\Delta\phi$ of the positioning pulse P. In the calculation step, by using the predicted time of arrival t of the positioning pulse P, the location of the mobile station 11 is calculated.

In this embodiment, in the above-described prediction step, the time difference of arrival $t_{nm}$ of the positioning pulse P between the fixed stations n and m in the posteriori period at time k is calculated according to the above formula (1), and the difference $\Delta\phi_{nm}$ between the carrier wave phase difference $\phi_{nm}^{(k)}(=\phi_m^{(k)}-\phi_n^{(k)})$ and the carrier wave phase difference $\phi_{nm}^{(k-1)}(=\phi_m^{(k-1)}-\phi_n^{(k-1)})$ is calculated according to the above formula (2). The carrier wave phase difference $\phi_{nm}^{(k)}$ is a carrier wave phase difference of the positioning pulse P between the fixed stations n and m in the posteriori period at time k. The carrier wave phase difference $\phi_{nm}^{(k-1)}$ is a carrier wave phase difference of the positioning pulse P between the fixed stations n and m in the posteriori period at time k−1, which is one period earlier. Then, calculation is performed by using the above-described error reduction algorithm to increase the reliability of the time difference of arrival $t_{nm}'$ of the positioning pulse P in the following posteriori period at time k+1. The time difference of arrival $t_{nm}'$ is predicted from the time difference of arrival $t_{nm}$ and the difference $\Delta\phi_{nm}$ between the carrier wave phase differences.

The time difference of arrival $t_{nm}'$ of the positioning pulse P in the following posteriori period at time k+1 is predicted to be close to the value represented by the following formula (3) where ω is the angular frequency of the carrier wave of the positioning pulse P.

$$t_{nm}'=t_{nm}+dt\times(\Delta\phi_{nm}/\omega) \quad (3)$$

Then, the value of the time difference of arrival $t_{nm}$ actually measured in the following posteriori period at time k+1 is compared with the value predicted according to the formula (3), and calculation is performed to increase the reliability by using the above-described error reduction algorithm, thereby enabling estimation of the time difference of arrival $t_{nm}$ with higher accuracy. This a posteriori process is performed one by one at each posteriori timing, and thereby the time difference of arrival $t_{nm}$ with higher accuracy can be obtained. In this embodiment, as the above-described error reduction algorithm based on the prediction and measurement, a known Kalman filter algorithm is used, and a system state measurement value is acquired every time the time step proceeds in accordance with the posteriori period. The acquired state measurement value is compared with the system state predicted value that is predicted one time step earlier, and the state predicted value of the following time step is corrected, and thereby a more reliable system state value is predicted.

The following formulas (4) and (5) respectively illustrate, by using matrices, a state equation and an observation equation in a case in which the Kalman filter algorithm is applied to the carrier wave phase difference $\Delta\phi_{nm}$ between the fixed stations n and m in this embodiment.

[Math 1]

Predict (4)

$$\begin{bmatrix} t_{nm} \\ \Delta\phi_{nm} \\ \Delta\dot{\phi}_{nm} \end{bmatrix}_{k|k-1} = \begin{bmatrix} 1 & 1/\omega & dt/2\omega \\ 0 & 1 & dt \\ 0 & 0 & 1 \end{bmatrix} \begin{bmatrix} t_{nm} \\ \Delta\phi_{nm} \\ \Delta\dot{\phi}_{nm} \end{bmatrix}_{k-1|k-1} + \begin{bmatrix} 1 & dt/2\omega \\ 0 & dt \\ 0 & 1 \end{bmatrix} \begin{bmatrix} \sigma_{wt}^2 \\ \sigma_{w\phi}^2 \end{bmatrix}$$

Posteriori (5)

$$\begin{bmatrix} t_{nm} \\ \phi_{nm}^{(k)}-\phi_{nm}^{(k-1)} \end{bmatrix}_{k|k} = \begin{bmatrix} 1 & 0 & 0 \\ 0 & 1 & 0 \end{bmatrix} \begin{bmatrix} t_{nm} \\ \Delta\phi_{nm} \\ \Delta\dot{\phi}_{nm} \end{bmatrix}_{k|k-1} + \begin{bmatrix} \sigma_{vt}^2 \\ \sigma_{v\phi}^2 \end{bmatrix}$$

In the formulas, each symbol with a dot (·) added to the carrier wave phase difference $\Delta\phi_{nm}$ represents a first derivative of the carrier wave phase difference $\Delta\phi_{nm}$, and $\sigma_{wt}$, $\sigma_{w\phi}$, $\sigma_{vt}$, and $\sigma_{v\phi}$ in the second terms of the right sides in the formulas (4) and (5) represent noise on the assumption in accordance with a Gaussian distribution.

With a Kalman filter, two processes of prediction (Predict) and a posteriori (Posteriori) are performed every time a single time step proceeds. In the prediction process, according to the above formula (4), from the system state predicted value in the preceding time step at time k−1, the system state value in the current time step at time k is calculated and estimated. In the a posteriori process, the system state measurement value in the current time step at time k is acquired, the estimated system state value is corrected according to the above formula (5), and thereby a more accurate system state value is predicted.

In order not to generate the ambiguity of the phase as a result of shift of the carrier wave phase ϕ by an integer multiple of 360°(=2π), in this embodiment, the time interval dt of a posteriori period is set to a time interval with which the difference $\Delta\phi_{nm}$ between the carrier wave phase differences, which is changed during the time interval dt by the movement of the mobile station 11 at an assumable maximum movement speed, is no greater than 180°(=π) even if errors are taken into account.

The location of the mobile station 11 is calculated according to a calculation method using a typical TDOA technique, on the basis of the thus calculated time difference of arrival $t_{nm}$ of the positioning pulse P and the time difference of arrival $t_{nm}'$ of the positioning pulse P predicted more accurately by using the Kalman filter from the difference $\Delta\phi_{nm}$ between the carrier wave phase differences.

In such a location system and a computer program according to this embodiment, the time of arrival t of the positioning pulse P used for the location calculation of the mobile station 11 is predicted by using the carrier wave phase difference Δϕ with higher accuracy by a few orders of magnitude than the time accuracy. Accordingly, the location of the mobile station 11 is calculated with high accuracy even in a case in which UWB with a large signal occupied band width and a high distance resolution is not used. In addition, since the absolute location of the mobile station 11 is calculated on the basis of the absolute value of the time of arrival t predicted with high accuracy by using the error reduction algorithm, the initial location of the mobile station 11 does not have to be acquired in advance. Even in a case in which an error is generated by any chance as a result of a phase shift by an integer multiple of 360°, the prediction process is continuously updated one by one by using the error reduction algorithm, and thereby the phase shift is corrected. Thus, in a case in which the mobile station moves more than the half wavelength, a process for acquiring the state thereof by some means or other and correcting the state is unnecessary unlike in the known technique.

In addition, in the location system and the computer program according to this embodiment, the time interval dt of the posteriori period is set to a time interval with which the difference $\Delta\phi_{nm}$ between the carrier wave phase differences is no greater than 180°, and accordingly, the failure of identifying the location of the mobile station 11 can be prevented, the failure being caused by the ambiguity of the phase as a result of the difference $\Delta\phi_{nm}$ becoming 180° or greater owing to the movement of the mobile station 11 during the time interval dt of the posteriori period. Accordingly, the time difference of arrival $t_{nm}$ of the positioning pulse P is predicted with extremely high accuracy by using the error reduction algorithm, and the mobile station 11 can be located with extremely high accuracy.

In addition, since the error reduction algorithm is a Kalman filter algorithm, by using a known, relatively easy algorithm, the location system and the computer program according to this embodiment can predict the time difference of arrival $t_{nm}$ of the positioning pulse P easily and accurately.

Next, a location system and a computer program according to a second embodiment of the present disclosure will be described.

A fundamental configuration of the location system according to the second embodiment is illustrated in the same block diagram in FIG. 1 as that of the location system according to the first embodiment. However, as illustrated in a timing chart in FIG. 3, the mobile station 11 repeatedly transmits the positioning pulse P a plurality of times, with a predetermined time interval dp, in each posteriori period of location calculation with the time interval dt. In this embodiment, the positioning pulse P is transmitted twice in each posteriori period of the time interval dt. Each of the fixed stations 1, 2, and 3 detects the time of arrival t of at least one positioning pulse P among the plurality of times and the carrier wave phases ϕ of two or more positioning pulses P among the plurality of times. In this embodiment, the times of arrival t of two positioning pulses P and the carrier wave phases ϕ of two positioning pulses P are measured in each posteriori period.

Figure 3:
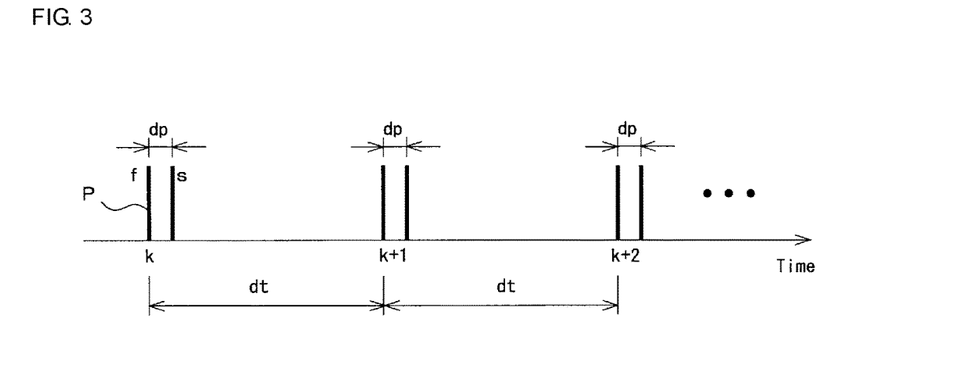
FIG. 3 is a timing chart illustrating transmission timings of a positioning pulse to be transmitted from a mobile station to each of fixed stations in a location system according to a second embodiment.

Here, in a case in which the first-time positioning pulse P is f, the second-time positioning pulse P is s, and the fixed stations 1, 2, and 3 are n (n=1, 2, 3), the measurement results of the time of arrival t and the carrier wave phase ϕ of the first-time positioning pulse f are referred to as a time of arrival $t_n^{(f)}$ and a carrier wave phase $\phi_n^{(f)}$, and the measurement results of the time of arrival t and the carrier wave phase ϕ of the second-time positioning pulse s are referred to as a time of arrival $t_n^{(s)}$ and a carrier wave phase $\phi_n^{(s)}$.

The location calculation server 21 includes a prediction unit and a location calculation unit. The prediction unit predicts, from the time of arrival t of the positioning pulse P in a posteriori period at the preceding time k−1, the time of arrival t of the positioning pulse P in a posteriori period at the following time k by using a carrier wave phase difference Δϕ of the positioning pulse P. Also in the second embodiment, the prediction is enabled by using the same error reduction algorithm as that in the first embodiment, that is, a Kalman filter algorithm. The location calculation unit calculates the location of the mobile station 11 by using the time of arrival t of the positioning pulse P predicted by the prediction unit. However, a time difference calculation unit, a phase difference calculation unit, and an error reduction unit included in the prediction unit in the second embodiment differ from those in the first embodiment as follows.

The time difference calculation unit in the second embodiment calculates a time difference of arrival $t_{nm}$ of the positioning pulse P between fixed stations n and m (m=1, 2, 3≠n) from the time of arrival t of at least one positioning pulse P among the plurality of times, which is, in this embodiment, two positioning pulses P, according to the following formula (6).

$$t_{nm} = \{(t_m^{(f)} - t_n^{(f)}) + (t_m^{(s)} - t_n^{(s)})\}/2 \qquad (6)$$

Although the time difference of arrival $t_{nm}$ can be the average of the first-time time difference of arrival $(t_m^{(f)} - t_n^{(f)})$ and the second-time time difference of arrival $(t_m^{(s)} - t_n^{(s)})$ as in the formula (6), one of the time differences of arrival $(t_m^{(f)} - t_n^{(f)})$ and $(t_m^{(s)} - t_n^{(s)})$ may be used. The reason why the average can be used is because errors can be reduced. The time difference of arrival $t_{nm}$ is calculated for each combination of the fixed stations 1, 2, and 3.

The phase difference calculation unit in the second embodiment calculates a difference $\Delta\phi_{nm}$ according to the following formula (7). The difference $\Delta\phi_{nm}$ is a difference between a carrier wave phase difference $\phi_{nm}^{(f)}$ and a carrier wave phase difference $\phi_{nm}^{(s)}$ for two or more positioning pulses P among the plurality of times. In this embodiment, the carrier wave phase difference $\phi_{nm}^{(f)}$ is a carrier wave phase difference of the positioning pulse P between the fixed stations n and m, calculated from the carrier wave phases $\phi_n^{(f)}$ and $\phi_m^{(f)}$ of the first-time positioning pulse P of two positioning pulses P. The carrier wave phase difference $\phi_{nm}^{(s)}$ is a carrier wave phase difference of the positioning pulse P between the fixed stations n and m, calculated from the carrier wave phases $\phi_n^{(s)}$ and $\phi_m^{(s)}$ of the other-time, second-time positioning pulse P.

$$\Delta\phi_{nm} = \phi_{nm}^{(s)} - \phi_{nm}^{(f)} = (\phi_m^{(s)} - \phi_n^{(s)}) - (\phi_m^{(f)} - \phi_n^{(f)}) \qquad (7)$$

The difference $\Delta\phi_{nm}$ is also calculated for each combination of the fixed stations 1, 2, and 3.

By using the Kalman filter algorithm, the error reduction unit in the second embodiment performs calculation to increase the reliability of a time difference of arrival $t_{nm}'$ of the positioning pulse P in the following posteriori period at time k+1. The time difference of arrival $t_{nm}'$ is predicted from the time difference of arrival $t_{nm}$ and the difference $\Delta\phi_{nm}$ between the carrier wave phase differences.

A ROM in the location calculation server 21 has a computer program stored therein, the computer program causing a computer to execute an input step, a prediction step, and a calculation step, as in the first embodiment. In the input step, the time of arrival t and the carrier wave phase ϕ of the positioning pulse P are input. The positioning pulse P is repeatedly transmitted from the mobile station 11 in each posteriori period and is received by each of the at least three fixed stations 1, 2, and 3 whose install positions are known. In the prediction step, by using the Kalman filter algorithm, from a time of arrival $t_k$ of the positioning pulse P in the preceding posteriori period, a time of arrival $t_{k+1}$ of the positioning pulse P in the following posteriori period is predicted by using the carrier wave phase difference Δϕ of the positioning pulse P. In the calculation step, by using the predicted time of arrival t of the positioning pulse P, the location of the mobile station 11 is calculated.

In the second embodiment, however, in the above-described input step, the time of arrival t of at least one positioning pulse P among a plurality of times and carrier wave phases ϕ of two or more positioning pulses P among the plurality of times, which are detected by each of the fixed stations 1, 2, and 3 from the positioning pulse P that is transmitted the plurality of times from the mobile station 11 in each posteriori period with the predetermined time interval dp, are input. In this embodiment, times of arrival t of two positioning pulses P and carrier wave phases ϕ of two positioning pulses P, which are detected by each of the fixed stations 1, 2, and 3 from the positioning pulse P that is transmitted twice in each posteriori period, are input.

In addition, in the above-described prediction step, the time difference of arrival $t_{nm}$ of the positioning pulse P between the fixed stations n and m is calculated from the times of arrival t of two positioning pulses P according to the above formula (6), and the difference $\Delta\phi_{nm}$ between the carrier wave phase difference $\phi_{nm}^{(f)}(=\phi_m^{(f)} - \phi_n^{(f)})$ and the carrier wave phase difference $\phi_{nm}^{(s)}(=\phi_m^{(s)} - \phi_n^{(s)})$ is calculated according to the above formula (7). The carrier wave phase difference $\phi_{nm}^{(f)}$ is a carrier wave phase difference of the positioning pulse P between the fixed stations n and m, calculated from the carrier wave phase ϕ of the first-time positioning pulse P of the two positioning pulses P. The carrier wave phase difference $\phi_{nm}^{(s)}$ is a carrier wave phase difference of the positioning pulse P between the fixed stations n and m, calculated from the carrier wave phase $\phi$ of the other-time, second-time positioning pulse P. Then, calculation is performed by using the Kalman filter algorithm to increase the reliability of the time difference of arrival $t_{nm}'$ of the positioning pulse P in the following posteriori period at time k+1, which is predicted from the time difference of arrival $t_{nm}$ and the difference $\Delta\phi_{nm}$ between the carrier wave phase differences.

On the basis of the time difference of arrival $t_{nm}$ and the difference $\Delta\phi_{nm}$ between the carrier wave phase differences at an a posteriori timing at time k, the time difference of arrival $t_{nm}'$ of the positioning pulse P in the following posteriori period at time k+1 is predicted to be close to the value represented by the following formula (8) where $\omega$ is the angular frequency of the carrier wave.

$$t_{nm}' = t_{nm} + (dt/dp) \times (\Delta\phi_{nm}/\omega) \qquad (8)$$

Then, the value of the time difference of arrival $t_{nm}$ actually measured in the following posteriori period at time k+1 is compared with the value predicted according to the formula (8), and calculation is performed to increase the reliability by using the Kalman filter algorithm, thereby enabling estimation of the time difference of arrival $t_{nm}$ with higher accuracy. This a posteriori process is performed one by one at each posteriori timing, and thereby the time difference of arrival $t_{nm}$ with higher accuracy can be obtained.

The following formulas (9) and (10) respectively illustrate, by using matrices, a state equation and an observation equation in a case in which the Kalman filter algorithm is applied to the carrier wave phase difference $\Delta\phi_{nm}$ between the fixed stations n and m in this embodiment.

[Math 2]

Predict (9)

$$\begin{bmatrix} t_{nm} \\ \Delta\phi_{nm} \\ \Delta\dot{\phi}_{nm} \end{bmatrix}_{k|k-1} = \begin{bmatrix} 1 & dt/\omega dp & dt^2/2\omega dp \\ 0 & 1 & dt \\ 0 & 0 & 1 \end{bmatrix} \begin{bmatrix} t_{nm} \\ \Delta\phi_{nm} \\ \Delta\dot{\phi}_{nm} \end{bmatrix}_{k-1|k-1} + \begin{bmatrix} 1 & dt^2/2\omega dp \\ 0 & dt \\ 0 & 1 \end{bmatrix} \begin{bmatrix} \sigma_{vt}^2 \\ \sigma_{v\phi}^2 \end{bmatrix}$$

Posteriori (10)

$$\begin{bmatrix} t_{nm} \\ \phi_{nm}^{(s)} - \phi_{nm}^{(f)} \end{bmatrix}_{kk} = \begin{bmatrix} 1 & 0 & 0 \\ 0 & 1 & 0 \end{bmatrix} \begin{bmatrix} t_{nm} \\ \Delta\phi_{nm} \\ \Delta\dot{\phi}_{nm} \end{bmatrix}_{kk-1} + \begin{bmatrix} \sigma_{vt}^2 \\ \sigma_{v\phi}^2 \end{bmatrix}$$

Each symbol in the formulas (9) and (10) is the same as a corresponding symbol in the formulas (4) and (5). In a prediction (Predict) process, according to the above formula (9), from the system state predicted value in the preceding time step at time k−1, the system state value in the current time step at time k is calculated and estimated. In an a posteriori (Posteriori) process, the system state measurement value in the current time step at time k is acquired, the estimated system state value is corrected according to the above formula (10), and thereby a more accurate system state value is predicted.

In order not to generate the ambiguity of the phase as a result of shift of the carrier wave phase $\phi$ by an integer multiple of 360°(=2π), also in this embodiment, the time interval dp of the positioning pulse P that is transmitted twice in each posteriori period is set to a time interval with which the difference $\Delta\phi_{nm}$ between the carrier wave phase differences, which is changed during the time interval dp by the movement of the mobile station 11 at an assumable maximum movement speed, is no greater than 180°(=π) even if errors are taken into account. On the other hand, since errors of the phase in the prediction (predict) increase at dt/dp, in order to ensure higher location accuracy, the time interval dp can be a value as large as possible in the state in which the conditions for a time interval are satisfied such that the difference $\Delta\phi_{nm}$ is no greater than 180°.

Also in this embodiment, the location of the mobile station 11 is calculated according to a calculation method using a typical TDOA technique, on the basis of the thus calculated time difference of arrival $t_{nm}$ of the positioning pulse P and the time difference of arrival $t_{nm}'$ of the positioning pulse P predicted more accurately by using the Kalman filter from the difference $\Delta\phi_{nm}$ between the carrier wave phase differences.

In such a location system and a computer program according to the second embodiment, the time of arrival t of the positioning pulse P used for the location calculation of the mobile station 11 is predicted by using the carrier wave phase difference $\Delta\phi$ with higher accuracy by a few orders of magnitude than the time accuracy. Accordingly, as in the first embodiment, the location of the mobile station 11 is calculated with high accuracy even in a case in which UWB with a large signal occupied band width and a high distance resolution is not used. In addition, since the absolute location of the mobile station 11 is calculated on the basis of the absolute value of the time of arrival t predicted with high accuracy by using the error reduction algorithm, the initial location of the mobile station 11 does not have to be acquired in advance. Even in a case in which an error is generated by any chance as a result of a phase shift by an integer multiple of 360°, the prediction process is continuously performed one by one by using the error reduction algorithm, and thereby the phase shift is corrected. Thus, in a case in which the mobile station moves more than the half wavelength, a process for acquiring the state thereof by some means or other and correcting the state is unnecessary.

In addition, in the location system and the computer program according to the second embodiment, the time interval dp of the positioning pulse P transmitted a plurality of times in each posteriori period is set to a time interval with which the difference $\Delta\phi_{nm}$ between the carrier wave phase differences is no greater than 180°, and accordingly, the failure of identifying the location of the mobile station 11 can be prevented, the failure being caused by the ambiguity of the phase as a result of the difference $\Delta\phi_{nm}$ becoming 180° or greater owing to the movement of the mobile station 11 during the time interval dp. Accordingly, also in the second embodiment, the time difference of arrival $t_{nm}$ of the positioning pulse P is predicted with extremely high accuracy by using the error reduction algorithm, and the mobile station 11 can be located with extremely high accuracy.

In addition, since the error reduction algorithm is a Kalman filter algorithm, by using a known, relatively easy algorithm, the location system and the computer program according to the second embodiment can also predict the time difference of arrival $t_{nm}$ of the positioning pulse P easily and accurately.

The first embodiment has described a case in which the movement amount of the mobile station 11 is sufficiently small, that is, a case in which the movement speed of the mobile station 11 is low and a case in which the time interval dt of the posteriori period is sufficiently short. However, with the location system and the computer program according to the second embodiment, the time interval dp of the positioning pulse P that is transmitted a plurality of times from the mobile station 11 in each posteriori period is adjusted to be shorter than the time interval for preventing the ambiguity of the phase as a result of the movement of the mobile station 11, and accordingly, the time interval dt of each posteriori period can be made longer than the time interval for preventing the ambiguity of the phase as a result of the movement of the mobile station 11. Thus, according to the second embodiment, in addition to the above-described effects of the first embodiment, effects of reducing the transmission frequency of the positioning pulse P from the mobile station 11 and of reducing power consumption of the system are produced. That is, the driving time of the system can be increased by using a battery with the same capacity. Alternatively, the weight of the battery necessary to achieve the same driving time can be reduced. In addition, since the transmission frequency of the positioning pulse P can be reduced, an effect of reducing the occurrence frequency of collision can be produced even in a case of configuring an RTLS in which a plurality of mobile stations 11 transmit a signal.

In addition, in the location system and the computer program according to the second embodiment, the number of times of transmission of the positioning pulse P that is transmitted a plurality of times with the predetermined time interval dp from the mobile station 11 is limited to two, which is the minimum of a plurality of times. Thus, the power consumption of the system and the occurrence frequency of collision can be reduced to the maximum.

Note that the number of times of transmission of the positioning pulse P is set to two, which is the minimum of a plurality of times, in the second embodiment as described above, but may be a plurality of times being three or more. As the number of transmission of the positioning pulse P increases, more errors can be reduced.

In addition, the first and second embodiments have described the three fixed stations 1, 2, and 3. However, the number of fixed stations may be any number greater than or equal to three in a case of two-dimensional (2D) locating as in the above embodiments or may be any number greater than or equal to four in a case of three-dimensional (3D) locating. As the number increases, the redundancy increases, and a plurality of locations are detected in accordance with the combination of the fixed stations. Thus, by considering these locations, it is more likely that the location accuracy is further increased. In addition, the number of mobile stations 11 is not limited to one either. By also using a method for identifying a plurality of mobile stations by using IDs or the like, the system may track and detect the plurality of mobile stations.

Furthermore, although an RTLS using a TDOA is given as an example in the first and second embodiments, in a case in which the mobile station is also synchronized, the above-described method for increasing the time accuracy in the above-described embodiments is also applicable to a time of arrival (TOA) system in the same manner. In this case, the above method is applied to, instead of the time difference and the phase difference between fixed stations, a transmission-reception time difference and a carrier wave phase difference between the mobile station and each of the fixed stations.

In addition, the first and second embodiments have described the error reduction algorithm for predicting a more reliable system state value by correcting an error included in a system state value on the basis of a state measurement value, as a Kalman filter algorithm that predicts, from a state value in the preceding posteriori period, a state value in the following posteriori period and that corrects the error by using an actually acquired state value in the following posteriori period. However, the error reduction algorithm based on prediction and actual measurement is not limited to the Kalman filter algorithm. For example, the same effects as those in the above embodiments can be produced also in a case of using, as the above error reduction algorithm, an algorithm of a particle filter that is recognized as a method for sequentially assimilating a simulation model and observation data, a maximum likelihood estimation for calculating a likelihood function and a maximum estimate amount with a known probability distribution to calculate a maximum estimate value, or the like. In a case of using a Kalman filter, the state equation and the observation equation for representing a system state space model are not limited to the formulas illustrated in the above-described embodiments either.

In addition, the first and second embodiments have described a case in which, as in a typical TDOA-based RTLS, the times and phases of all the fixed stations 1, 2, and 3 are synchronized via the wire 22 or wirelessly. However, if a reference signal is distributed to each of the fixed stations 1, 2, and 3 from a reference station whose location is fixed at substantially the same time as the measurement timing of each of the fixed stations 1, 2, and 3, the fixed stations 1, 2, and 3 do not have to be synchronized via the wire 22 or wirelessly, making it easier to configure the system.

In this case, each of the fixed stations 1, 2, and 3 is operated with a reference clock at the same frequency, but is independently operated without necessarily synchronization. In addition, on the basis of a reference clock for a mobile station, the mobile station 11 transmits a first radio signal as the positioning pulse P in a predetermined transmission period. On the basis of a reference clock for a reference station, the reference station transmits a second radio signal as a reference signal. In this case, the mobile station 11 transmits a trigger radio signal for causing the reference station to transmit the second radio signal, and in response to the reception of the trigger signal, the reference station transmits the second radio signal. Each of the fixed stations 1, 2, and 3 receives the first radio signal to extract a phase difference between the carrier wave phase of the first radio signal and the reference clock phase of each of the fixed stations 1, 2, and 3, and receives the second radio signal to extract a phase difference between the carrier wave phase of the second radio signal and the reference clock phase of each of the fixed stations 1, 2, and 3.

By using information about the phase difference between the mobile station 11 and each of the fixed stations 1, 2, and 3 and information about the phase difference between the reference station and each of the fixed stations 1, 2, and 3, the location calculation server 21 cancels a phase offset of the reference clock of each of the fixed stations 1, 2, and 3. That is, by subtracting the phase difference information obtained by the fixed station m from the phase difference information obtained by the fixed station n, the location calculation server 21 calculates the carrier wave phase difference $\Delta\phi_{nm}$ between the fixed stations m and n for which the phase offset among the mobile station 11, the reference station, and the fixed stations n and m is canceled. The phase offset here means a phase shift generated by independent operation, without necessarily synchronization, of the mobile station 11, he reference station, and the fixed stations 1, 2, and 3. The cancellation of the phase offset eliminates the need for synchronization of the fixed stations 1, 2, and 3.

REFERENCE SIGNS LIST 1, 2, 3 fixed station
11 mobile station
21 location calculation server (calculation apparatus)
22 wire
P positioning pulse (radio signal)
dt time interval of a posteriori period
dp transmission time interval in each posteriori period

The invention claimed is:
1. A location system comprising:
at least three fixed stations having known install locations;
at least one mobile station configured to transmit a radio signal to each of the fixed stations in each posteriori period of a location calculation; and
at least one processor configured to calculate a location of the mobile station based on an arrival time of the radio signal at each of the fixed stations, wherein:
each of the fixed stations is further configured to:
  detect the arrival time of the radio signal in each posteriori period, and
  detect a carrier wave phase of the radio signal, and
the at least one processor is further configured to:
  predict, from the arrival time of the radio signal in a preceding posteriori period, the arrival time of the radio signal in a following posteriori period based on a carrier wave phase difference of the radio signal by using an error reduction algorithm that predicts a system state value by correcting an error included in a non-predicted system state value based on a system state measurement value, and
  calculate the location of the mobile station by using the predicted arrival time of the radio signal,
wherein:
the mobile station is configured to transmit a plurality of radio signals at a plurality of times having a predetermined time interval in each posteriori period,
each of the fixed stations is configured to detect arrival times of at least one radio signal among the plurality of radio signals and carrier wave phases of two or more radio signals among the plurality of radio signals, and
the at least one processor is configured to:
  calculate a difference of arrival times of the plurality of radio signals between the fixed stations from the arrival time of the at least one radio signal,
  calculate a difference between a carrier wave phase difference of the plurality of radio signals between the fixed stations from a carrier wave phase of a radio signal among two or more radio signals,
  calculate a carrier wave phase difference of the plurality of radio signals between the fixed stations from a carrier wave phase of an other-time radio signal, and
  use the error reduction algorithm to increase the reliability of the predicted arrival times of the plurality of radio signals in the following posteriori period, the arrival times being predicted from the difference of arrival times and the difference between the carrier wave phase differences.

2. The location system according to claim 1, wherein the at least one processor is further configured to:
calculate the difference between the carrier wave phase difference of the radio signal between the fixed stations and the carrier wave phase difference of the radio signal between the fixed stations in an immediately preceding posteriori period, and
use the error reduction algorithm to increase the reliability of the predicted arrival time of the radio signal in the following posteriori period, the arrival time being predicted from the difference of the arrival times and the difference between the carrier wave phase differences.

3. A location method comprising:
inputting an arrival time and a carrier wave phase of a radio signal, the radio signal being transmitted from at least one mobile station in each posteriori period of a location calculation and being received by each of at least three fixed stations having known install positions;
predicting, from the arrival time of the radio signal in a preceding posteriori period, the arrival time of the radio signal in a following posteriori period by using a carrier wave phase difference of the radio signal by using an error reduction algorithm that predicts a system state value by correcting an error included in a non-predicted system state value based on a system state measurement value;
calculating a location of the mobile station by using the predicted arrival time of the radio signal,
inputting an arrival time of at least one radio signal among a plurality of radio signals and carrier wave phases of two or more radio signals among the plurality of radio signals, the at least one radio signal among the plurality of radio signals being detected by each of the fixed stations, and the plurality of radio signals being transmitted from the mobile station at a plurality of times having a predetermined time interval in each posteriori period, and
calculating a difference of arrival times of the plurality of radio signals between the fixed stations from the arrival time of the at least one radio signal,
calculating a difference between a carrier wave phase difference of the plurality of radio signals between the fixed stations from a carrier wave phase of a radio signal among two or more radio signals,
calculating a carrier wave phase difference of the radio signal between the fixed stations from a carrier wave phase of an other-time radio signal, and
using the error reduction algorithm to increase reliability of the predicted arrival times of the plurality of radio signals in the following posteriori period, the arrival times being predicted from the difference of arrival times and the difference between the carrier wave phase differences.

4. The location method according to claim 3, wherein predicting the arrival time of the radio signal in the following posteriori period further comprises:
calculating a difference between a carrier wave phase difference of the radio signal between the fixed stations and a carrier wave phase difference of the radio signal between the fixed stations in an immediately preceding posteriori period, and
using the error reduction algorithm to increase reliability of the predicted arrival time of the radio signal in the following posteriori period, the arrival time being predicted from the difference of arrival times and the difference between the carrier wave phase differences.

5. The location system according to claim 1, wherein the time interval of the posteriori period is a time interval with which the difference between the carrier wave phase differences, which are changed during the time interval of the posteriori period by movement of the mobile station, is no greater than 180°.

6. The location method according to claim 3, wherein the time interval of the posteriori period is a time interval with which the difference between the carrier wave phase differences, which is changed during the time interval of the posteriori period by movement of the mobile station, is no greater than 180°.

7. The location system according to claim 1, wherein the predetermined time interval of the plurality of radio signals transmitted the plurality of times in each posteriori period is a time interval with which the difference between the carrier wave phase differences, which is changed during the predetermined time interval by movement of the mobile station, is no greater than 180°.

8. The location method according to claim 3, wherein the predetermined time interval of the plurality of radio signals transmitted the plurality of times in each posteriori period is a time interval with which the difference between the carrier wave phase differences, which is changed during the predetermined time interval by movement of the mobile station, is no greater than 180°.

9. The location system according to claim 1, wherein two radio signals are transmitted from the mobile station with the predetermined time interval.

10. The location method according to claim 3, wherein two radio signals are transmitted from the mobile station with the predetermined time interval.

11. The location system according to claim 1, wherein the error reduction algorithm is a Kalman filter algorithm with which the system state measurement value is acquired every time a time step proceeds, the acquired state measurement value is compared with the predicted system state value predicted one time step earlier, and the non-predicted system state value of a following time step is corrected to predict the system state value.

12. The location method according to claim 3, wherein the error reduction algorithm is a Kalman filter algorithm with which the system state measurement value is acquired every time a time step proceeds, the acquired state measurement value is compared with the predicted system state value predicted one time step earlier, and the non-predicted system state value of a following time step is corrected to predict the system state value.

13. A non-transitory computer-readable medium having instructions stored thereon that, when executed by a computer, causes the computer to perform the method of claim 3.

* * * * *

UNITED STATES PATENT AND TRADEMARK OFFICE
CERTIFICATE OF CORRECTION

PATENT NO. : 10,459,068 B2
APPLICATION NO. : 15/872105
DATED : October 29, 2019
INVENTOR(S) : Osamu Shibata et al.

It is certified that error appears in the above-identified patent and that said Letters Patent is hereby corrected as shown below:

In the Specification

Column 12, Line 62, "$\phi_m^{(f)}(=\phi_m^{(f)}-\phi_n^{(f)})$" should read -- $\phi_{nm}^{(f)} (= \phi_m^{(f)} - \phi_n^{(f)})$ --

Column 17, Line 6, "11, he" should read -- 11, the --

Signed and Sealed this
Thirteenth Day of October, 2020

Andrei Iancu
*Director of the United States Patent and Trademark Office*